US012273594B2

(12) United States Patent
Tamburro et al.

(10) Patent No.: US 12,273,594 B2
(45) Date of Patent: Apr. 8, 2025

(54) SYSTEMS AND METHODS FOR DETERMINING SECONDARY CONTENT

(71) Applicant: Comcast Cable Communications, LLC, Philadelphia, PA (US)

(72) Inventors: Alessio Tamburro, Wilmington, DE (US); Meenakshi Sundaram Bagavathi Krishnan, Philadelphia, PA (US); Venkata Gunnu, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 354 days.

(21) Appl. No.: 17/248,539

(22) Filed: Jan. 28, 2021

(65) Prior Publication Data

US 2022/0239983 A1    Jul. 28, 2022

(51) Int. Cl.
*H04N 21/466*    (2011.01)
*H04N 21/442*    (2011.01)

(52) U.S. Cl.
CPC ... *H04N 21/4668* (2013.01); *H04N 21/44204* (2013.01); *H04N 21/4662* (2013.01)

(58) Field of Classification Search
None
See application file for complete search history.

(56) References Cited

U.S. PATENT DOCUMENTS 8,260,117 B1 *  9/2012  Xu ..................... H04N 21/4668
                                                386/343
8,869,198 B2 * 10/2014  Riveiro Insua .............................
                                            H04N 21/234318
                                                725/43
9,767,102 B2 *  9/2017  Zhao ..................... G06F 16/435
10,147,461 B1 * 12/2018  Bates ................... H04N 21/478
2009/0222854 A1 *  9/2009  Cansler ............. H04N 21/2387
                                                725/35

(Continued)

FOREIGN PATENT DOCUMENTS

WO    WO-2018094201 A1 *  5/2018 ........... G06F 16/685

OTHER PUBLICATIONS

Steven M. Kaplan, Wiley Electrical & Electronics Engineering Dictionary 507-08 (2004).*

(Continued)

*Primary Examiner* — William J Kim
(74) *Attorney, Agent, or Firm* — BakerHostetler

(57) ABSTRACT

A request associated with a user for content recommendation may be determined. At least one content item indicative of a viewing history associated with the user may be determined. The at least one content item indicative of the viewing history associated with the user may include content that the user has previously watched. Data associated with at least one image associated with each of a plurality of candidate content items may be determined. The plurality of candidate content items may include secondary content items that may be recommended to the user. Based on comparing data associated with at least one image associated with the at least one content item with the data associated with the at least one image associated with each candidate content item, at least one candidate content item may be determined. An indication of the at least one candidate content item may be sent, to a device associated with the user.

32 Claims, 7 Drawing Sheets

(56) References Cited

U.S. PATENT DOCUMENTS

| | | | | |
|---|---|---|---|---|
| 2016/0154887 A1* | 6/2016 | Zhao | ................... | G06F 16/435 |
| | | | | 707/723 |
| 2016/0371274 A1* | 12/2016 | Ng | ................... | G06F 16/24573 |
| 2017/0055014 A1* | 2/2017 | Bou Balust | ............ | G06Q 30/02 |
| 2018/0276479 A1* | 9/2018 | Harris | .............. | H04N 21/25891 |
| 2018/0357486 A1* | 12/2018 | Lau | ................. | H04N 21/44008 |
| 2019/0373322 A1* | 12/2019 | Rojas-Echenique | .... | G06F 16/75 |
| 2020/0134320 A1* | 4/2020 | Crossley | .......... | H04N 21/47815 |

OTHER PUBLICATIONS

William H. Hayt, Jr., Engineering Circuit Analysis 34 (3d ed. 1978).*

* cited by examiner

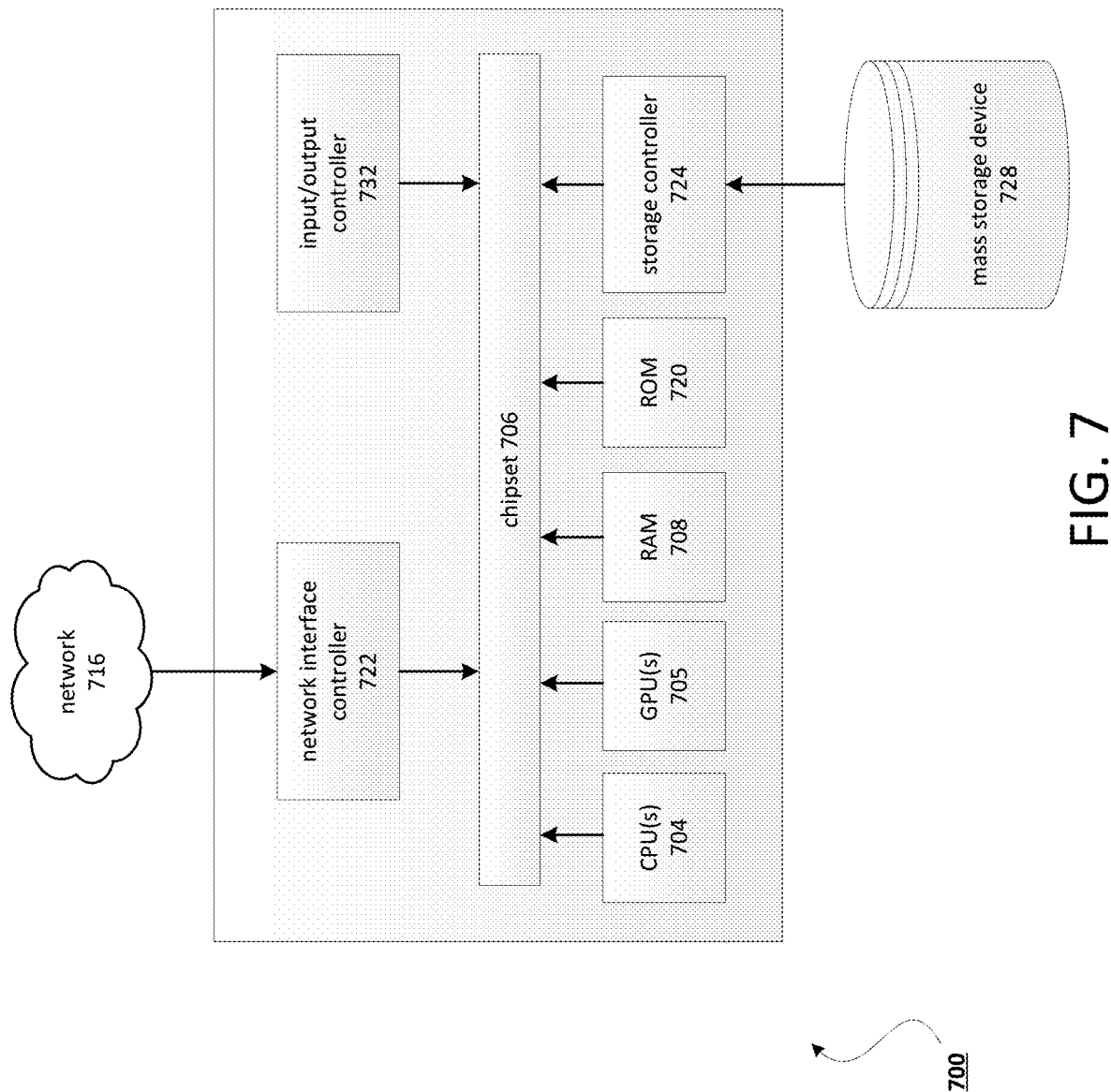

SYSTEMS AND METHODS FOR DETERMINING SECONDARY CONTENT

BACKGROUND

Secondary content may be output for viewing by one or more consumers. The secondary content may include supplemental content or content recommendations. For example, supplemental content may comprise one or more advertisements for products or services offered by third parties or by the content providers themselves. Content recommendations may include content, such as movies or television shows, that are recommended for a consumer to view. It may be desirable to improve the likelihood that the secondary content will be viewed by one or more target audience members that are most likely to be interested in viewing the secondary content.

SUMMARY

Methods and systems are disclosed for determining secondary content, such as supplemental content or recommended content. Supplemental content may include, for example, advertisements. Secondary content may be determined for a consumer based on the consumer's watching history. For example, secondary content that contains similar text, similar images, or both similar text and images to content in a consumer's watching history may be determined. If secondary content is similar to content in a consumer's watching history, this may increase the likelihood that the consumer is interested in viewing the secondary content. If the secondary content is supplemental content, the determined secondary content may be forwarded, to a device associated with the consumer, for insertion into other primary content output to the consumer. If the secondary content is recommended content, the determined secondary content may be forwarded, to a device associated with the consumer, for selection by the consumer.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 illustrates a block diagram of an example device according to an embodiment of the present disclosure.

DETAILED DESCRIPTION OF ILLUSTRATIVE EMBODIMENTS

A content provider may make content, such as television content or movie content, available for playback to one or more consumers. A content provider may additionally or alternatively cause output of secondary content to the one or more consumers. The secondary content may include supplemental content, such as one or more advertisements for products and services offered by third parties or by the content providers themselves. The secondary content may alternatively, or additionally, include content that is recommended for a consumer. For example, recommended content may include television or movie content that a user is likely to be interested in consuming. The secondary content may comprise any type of content that is capable of being output to the one or more consumers, such as video.

Secondary content may be personalized in order to target consumers that are most likely to be interested in viewing the secondary content. For example, secondary content may be personalized for consumers based on consumer interests or based on demographic information. However, personalized secondary content selected for a particular consumer may not actually be representative of that consumer. For example, the personalized secondary content that is selected for a consumer may be generic secondary content representative of a segment of consumers rather than of that of an individual consumer. Thus, multiple consumers may all be treated in a similar fashion even if they are not all interested in viewing the same secondary content.

It may therefore be desirable for a content provider to have a better awareness of the secondary content that individual consumers are likely to be interested in viewing. As described herein, to better personalize secondary content for individual consumers, watching histories of the consumers may be utilized. The content provider may use text data and/or image data from the content in a consumer's watching history to construct a set of consolidated features representative of the consumer's watching history. The content provider may additionally use text data and/or image data from secondary content, such as supplemental content or recommended content, to construct a set of consolidated features representative of each item of secondary content. Similarity metrics may be used to determine secondary content for the consumer based on the secondary content's affinity to the consumer's watching history. By utilizing an individual consumer's watching history when determining secondary content for that consumer, the content provider may ensure that the secondary content output to that consumer is actually representative of that consumer's interests.

Figure 1:
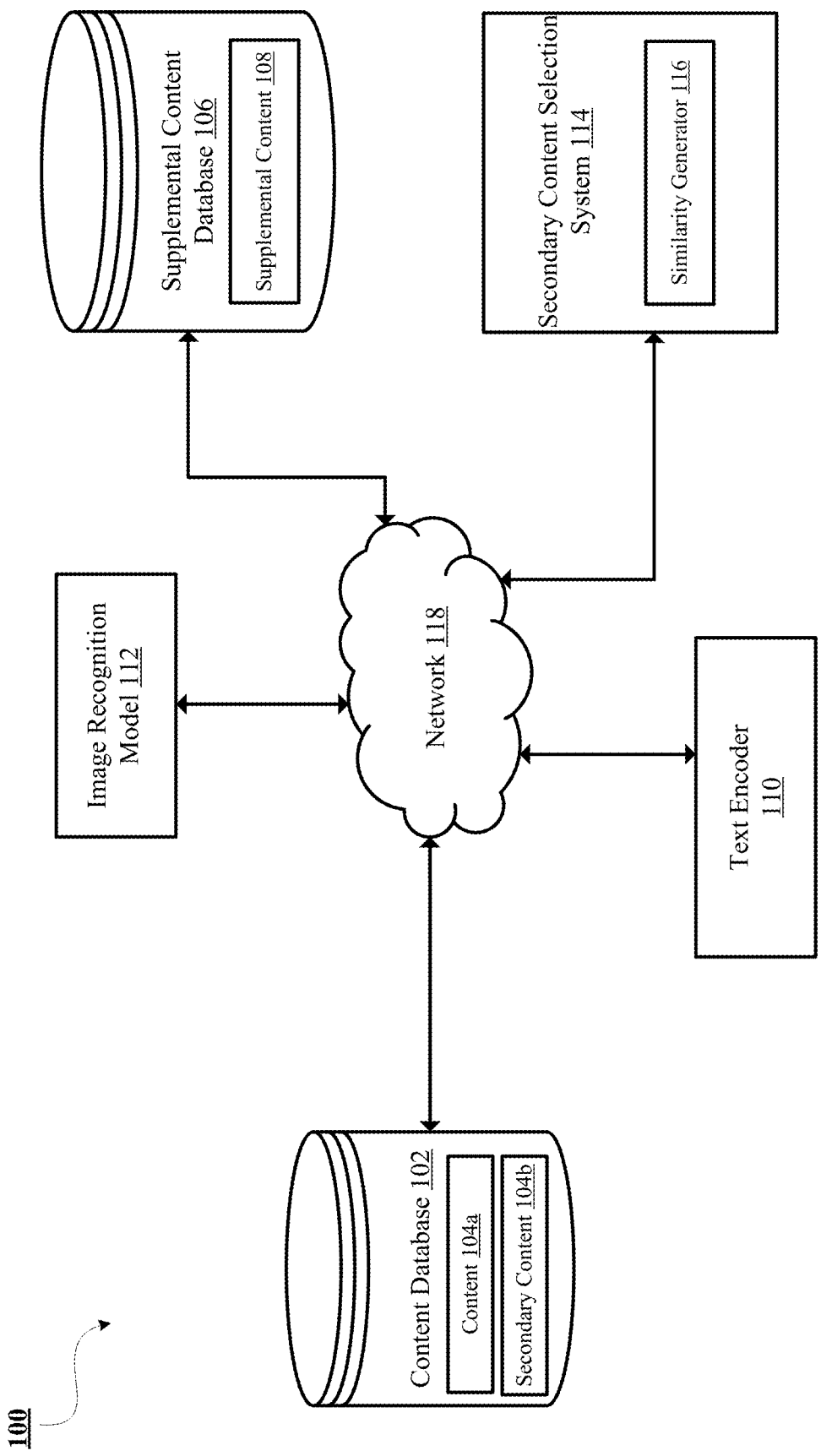
FIG. 1 illustrates a block diagram of an example environment according to an embodiment of the present disclosure.

FIG. 1 illustrates an example hardware and network configuration 100 in which the systems and methods described herein may be implemented. Such a hardware and network configuration 100 includes a content database 102, a supplemental content database 106, a text encoder 110, an image recognition model 112, and a secondary content selection system 114 in communication via a network 118. The secondary content selection system 114 may be associated with a business entity seeking to personalize secondary content, such as the content provider described above.

The secondary content selection system 114 may implement a number of the functions and techniques described herein. For example, the secondary content selection system 114 may receive, from the text encoder 110, encoded text data associated with content, such as content 104a stored in the content database 102. The content 104a may include content in a consumer's watching history. For example, the content 104*a* may include videos that a consumer has watched in the past. The secondary content selection system 114 may also receive, from the text encoder 110, encoded text data associated with secondary content, such as supplemental content 108 stored in the supplemental content database 106 or secondary content 104*b* stored in the content database 102. The supplemental content 108 may include advertisements that are capable of being output to the consumer, such as advertisements that are capable of being output to the consumer during the presentation of other types of content, such as the videos. The secondary content may include content 104*b* that is not in a consumer's watching history, such as movies or television shows that a consumer has not yet watched. The content 104*b* may include content that is capable of being output to the user for selection by the user, such as content that is recommended for the user to watch.

Figure 2:
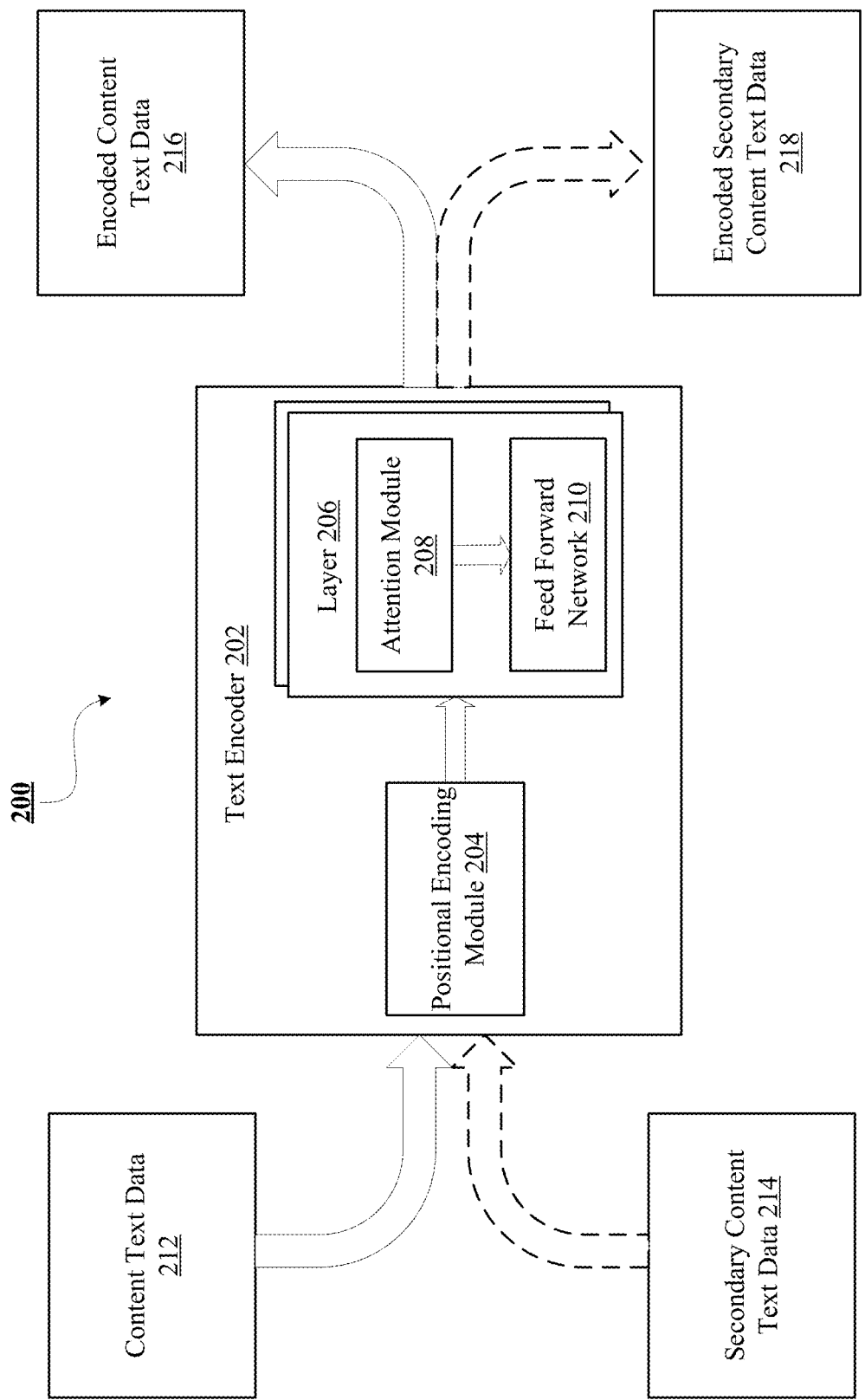
FIG. 2 illustrates a block diagram of an example text encoder according to an embodiment of the present disclosure.

The text encoder 110 may determine the encoded text data associated with content 104*a* or secondary content, such as supplemental content 108 and/or the content 104*b*. To determine the encoded text data associated with content 104*a*, the text encoder 110 may receive, as input, text data from content 104*a*. The text encoder 110 may encode the input text data and output the encoded text data to the secondary content selection system 114. To determine the encoded text data associated with secondary content, the text encoder 110 may receive, as input, text data from secondary content, such as supplemental content 108 or the content 104*b*. The text encoder 110 may encode the input text data and output the encoded text data to the secondary content selection system 114. FIG. 2, discussed below, illustrates an exemplary text encoder 202 in more detail.

The secondary content selection system 114 may receive, from the image recognition model 112, encoded image data associated with content 104 stored in the content database 102. As described above, the content 104*a* may include content in a consumer's watching history. For example, the content 104*a* may include videos that a consumer has watched in the past. The secondary content selection system 114 may also receive, from the image recognition model 112, encoded image data associated with secondary content, such as supplemental content 108 or content 104*b*. The secondary content may include advertisements that are capable of being output to the consumer, such as advertisements that are capable of being output to the consumer during the presentation of other types of content, such as the videos. Additionally, or alternatively, the secondary content may include content that is recommended for a user to watch.

Figure 3:
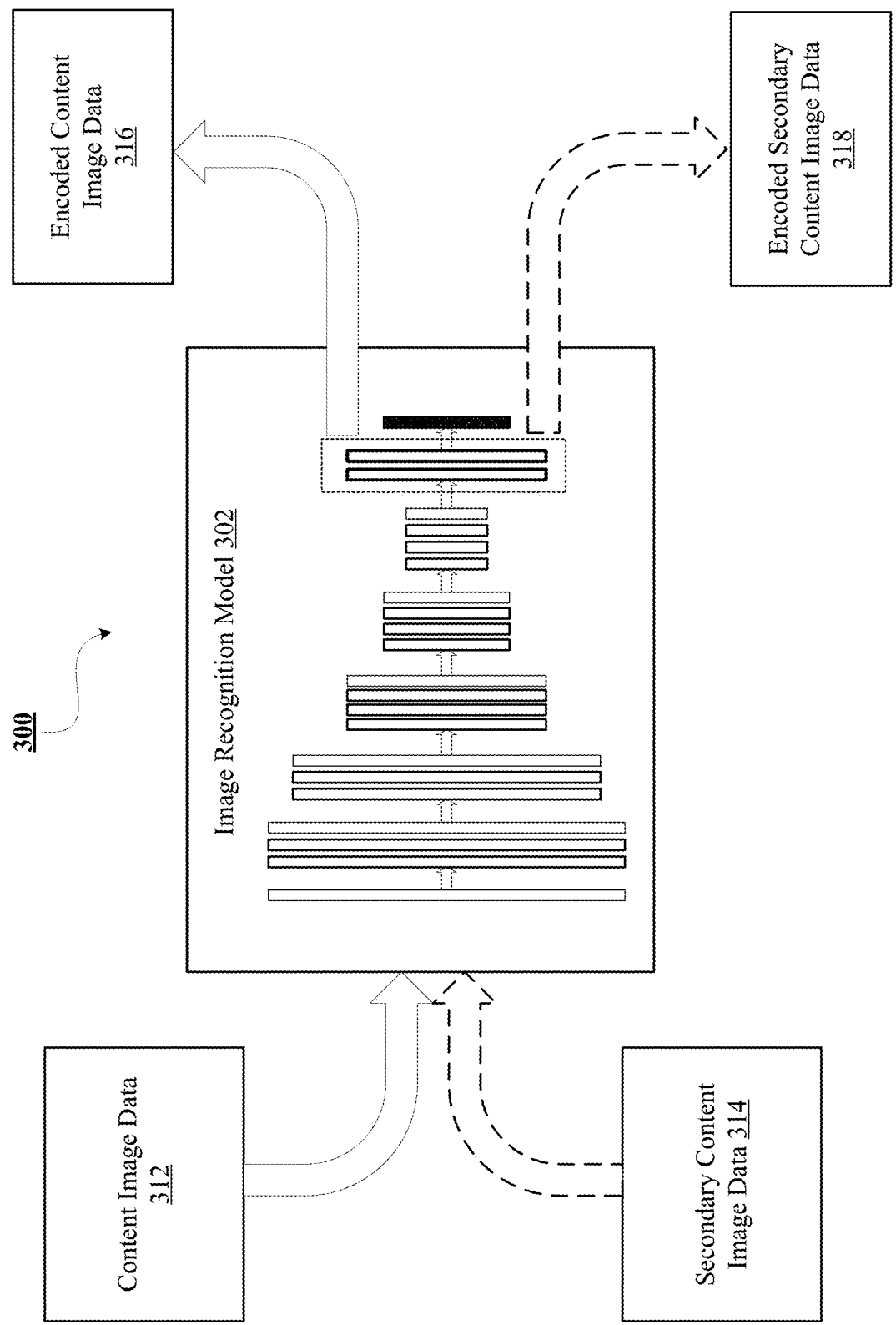
FIG. 3 illustrates a block diagram of an example image recognition model according to an embodiment of the present disclosure.

The image recognition model 112 may determine the encoded image data associated with content 104*a* or secondary content. To determine the encoded image data associated with content 104*a*, the image recognition model 112 may receive, as input, image data from content 104. The image recognition model 112 may encode the input image data and output the encoded image data to the secondary content selection system 114. To determine the encoded image data associated with the secondary content, the image recognition model 112 may receive, as input, image data from secondary content, such as supplemental content 108 or the content 104*b*. The image recognition model 112 may encode the input image data and output the encoded image data to the secondary content selection system 114. FIG. 3, discussed below, illustrates an exemplary image recognition model in more detail.

The secondary content selection system 114 may input the encoded text data and the encoded image data to a model, such as a similarity generator 116, to determine secondary content that is similar to the content 104*a*. For example, the secondary content selection system 114 may determine secondary content, such as one or more advertisements and/or one or more content recommendations, that contains both similar text and similar images to the content 104*a*. The secondary content selection system 114 may determine secondary content, such as one or more advertisements and/or one or more content recommendations, that contains only similar images to the content 104*a*, or may determine secondary content that contains only similar text to the content 104*a*. If the content 104*a* is content in a consumer's watching history, the secondary content selection system 114 may determine secondary content that contains similar text or similar images to the content in the consumer's watching history. Secondary content that contains similar text and/or similar images to content in a consumer's watching history may be representative of that consumer's interests. As a result, the consumer may be interested in viewing the secondary content.

The secondary content selection system 114 may determine secondary content that contains similar text to the content 104*a*, similar images to the content 104*a*, or both similar text and similar images to the content 104*a*. If the secondary content selection system 114 determines secondary content that contains both similar text and images to the content 104*a*, the secondary content selection system 114 may determine secondary content that contains similar text to the content 104*a* before it determines secondary content that contains similar images to the content 104*a*, or vice versa. Alternatively, the secondary content selection system 114 may simultaneously determine secondary content that contains similar text to the content 104*a* and secondary content that contains similar images to the content 104*a*.

To determine secondary content that contains similar text to the content 104*a*, the secondary content selection system 114 may determine a similarity between the encoded text data associated with the content 104*a* and the encoded text data associated with secondary content, such as supplemental content 108 and/or the content 104*b*. For example, the secondary content selection system 114 may determine a cosine similarity distance, such as a weighted cosine similarity distance, between the encoded text data associated with the content 104*a* and the encoded text data associated with secondary content. The similarity between the encoded text data associated with the content 104*a* and the encoded text data associated with secondary content may additionally, or alternatively, be indicative of any other measure of similarity including a Euclidean distance, a Manhattan distance, a Minkowski distance, or a Jaccard similarity.

To determine secondary content that contains similar images to the content 104*a*, the secondary content selection system 114 may determine a similarity between the encoded image data associated with the content 104*a* and the encoded image data associated with secondary content. For example, the secondary content selection system 114 may determine a cosine similarity distance, such as a weighted cosine similarity distance, between the encoded image data associated with the content 104*a* and the encoded image data associated with secondary content. The similarity between the encoded image data associated with the content 104*a* and the encoded image data associated with secondary content may additionally, or alternatively, be indicative of any other measure of similarity including a Euclidean distance, a Manhattan distance, a Minkowski distance, or a Jaccard similarity.

As noted above, the content database 102 and the supplemental content database 106 may respectively provide the text and image data from content 104a-b and the text and image data from supplemental content 108 to either the text encoder 110 or the image recognition model 112. The text encoder 110 or the image recognition model 112 may be integrated with the secondary content selection system 114. One or more of the content database 102 or the supplemental content database 106 may be associated with a business entity seeking to personalize secondary content, such as the content provider described above.

The content database 102, the supplemental content database 106, the text encoder 110, the image recognition model 112, and the secondary content selection system 114 may each comprise one or more computing devices and/or network devices, such as computing device illustrated in FIG. 7. For example, the secondary content selection system 114 may comprise one or more networked servers. The content database 102 and the supplemental content database 106 may each comprise a data storage device and/or system, such as a network-attached storage (NAS) system. The network 118 may comprise one or more public networks (e.g., the Internet) and/or one or more private networks. A private network may include a wireless local area network (WLAN), a local area network (LAN), a wide area network (WAN), a cellular network, or an intranet. The network 118 may comprise wired network(s) and/or wireless network(s).

A computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium. The computing device may comprise one or more input devices, such as a mouse, a keyboard, or a touch interface. The computing device may comprise one or more output devices, such as a monitor or other video display. The computing device may comprise an audio input and/or output. The computing device may comprise one or more network communication interfaces, such as a wireless transceiver (e.g., Wi-Fi or cellular) or wired network interface (e.g., ethernet). The one or more network communication interfaces may be configured to connect to the network 118.

As discussed above, the secondary content selection system 114 may receive, from a text encoder, encoded text data associated with content 104a or secondary content, such as supplemental content 108 and/or content 104b. FIG. 2 illustrates an exemplary text encoder 202 that is configured to encode text data, such as text data associated with content 104b or with secondary content. The text encoder 202 may be configured to encode text into high dimensional vectors, such as 512-dimensional vectors, that may be used for text classification, semantic similarity, clustering, or other natural language tasks. For example, the text encoder 202 may use Google's Universal Sentence Encoder or any other encoder configured to encode text into high dimensional vectors. The text encoder 202 may be trained to encode text of any length, including greater-than-word length text, such as sentences, phrases, or paragraphs of text. The text encoder 202 may use text of any language as input, including English text.

The text encoder 202 may use, as input, text data, such as content text data 212 or secondary content text data 214. If the text encoder 202 uses content text data 212 as input, the content text data 212 may be text data associated with content, such as the content 104a of FIG. 1. The content 104a may include content in a consumer's watching history. For example, the content 104a may include videos, such as movies or television shows, that a consumer has watched in the past. Text data associated with the content 104a may include data associated with the content's program synopsis. For example, a program synopsis for content 104a may include a brief summary of the content's concept, major plot points, and main characters.

If the text encoder 202 uses secondary content text data 214 as input, the secondary content text data 214 may include text data associated with supplemental content, such as the supplemental content 108 of FIG. 1, and/or text data associated with content that may be recommended for a user to watch, such as the content 104b of FIG. 1. If the secondary content includes supplemental content, the supplemental content may include advertisements that are capable of being output to a consumer, such as advertisements that are capable of being output to a consumer during the presentation of other types of content, such as movies or television shows. If the secondary content includes content that may be recommended for a user to watch, the secondary content may include movies or television shows that the user has not yet watched. Text data associated with the secondary content may include data associated with the secondary content's description. For example, if the secondary content includes supplemental content, the secondary content's description may include a brief summary of the product or service being sold in the advertisement or of the party selling the product or service. If the secondary content includes content that may be recommended for a user to watch, the secondary content's description may include data associated with the secondary content's program synopsis. For example, a program synopsis for content 104b may include a brief summary of the content's concept, major plot points, and main characters.

The text encoder 202 may, for example, be a transformer encoder that includes a positional encoding module 204 and at least one layer 206. The text encoder 202 may be configured to encode text into high dimensional vectors without recurrence or convolution. If the text encoder 202 is configured to encode text into high dimensional vectors without recurrence or convolution, the positional encoding module 204 may inject some information about the relative or absolute position of the letters or words in the text input, such as the content text data 212 or the secondary content text data 214. By injecting such information, the text encoder 202 may make use of the order of the letters or words in the text sequence when encoding the text into high dimensional vectors.

The at least one layer 206 may include, for example, six layers. Each layer 206 may include an attention module 208 and a feed forward network 210. The attention module 208 may take word order and surrounding context into account when generating representations of each word in the text sequence. The context-aware word embeddings may then be added elementwise and divided by the square root of the length of the sentence to account for the sentence-length difference. Because the text encoder 202 may be configured to encode text into high dimensional vectors without recurrence, the feed forward network 210 may feed the output of the attention module 208 in one direction, forward.

The output may be encoded text data, such as encoded content text data 216 or encoded secondary content text data 218. The text encoder 202 may be configured to output the encoded text data, such as encoded content text data 216 and encoded secondary content text data 218. For example, the input content text data 212 may be encoded by the text encoder 202 and then output as encoded content text data 216. Similarly, the input secondary content text data 214 may be encoded by the text encoder 202 and then output as encoded secondary content text data 218. The output encoded text data, such as encoded content text data 216 or encoded secondary content text data 218, may be high dimensional vectors, such as 512-dimensional vectors.

If the output encoded text data is a high dimensional vector, the high dimensional vector may indicate numeric values associated with the input text data, such as the input content text data 212 or the input secondary content text data 214. The numeric values can be, for example, hash values. These numeric values associated with the input text data may be used to determine secondary content that contains similar text to content, such as the content 104a. For example, the secondary content selection system 114 of FIG. 1 may utilize these numeric values to determine a similarity between text data associated with content and text data associated with secondary content. The secondary content selection system 114 may, for example, determine a cosine similarity distance, such as a weighted cosine similarity distance, between the encoded text data associated with the content and the encoded text data associated with secondary content using these numeric values. By determining secondary content that contains similar text to content in a consumer's watching history, a content provider may be able to provide secondary content, such as supplemental content or content recommendations, to the consumer that is representative of that consumer's interests. As a result, the consumer may be interested in viewing the provided secondary content.

As discussed above, the secondary content selection system 114 may receive, from an image recognition model, encoded image data associated with content or secondary content, such as supplemental content 108 and/or content 104b. FIG. 3 illustrates an exemplary image recognition model 302 that is configured to encode image data associated with content or secondary content. The image recognition model 302 may be a convolutional neural network model, such as VGG16. A convolutional neural network is a class of deep neural networks, most commonly applied to analyzing visual imagery. A convolutional neural network may take an input image, assign weights and biases to various aspects or objects in the image, and be able to differentiate the various aspects or objects from each other.

For example, if the image recognition model uses the VGG16 architecture, the input may be an RBG image of fixed size 224×224. The image may be passed through a stack of convolutional layers, including filters with a very small receptive field, such as 3×3 (which is the smallest size to capture the notion of left/right, up/down, center). The image may alternatively be passed through 1×1 convolution filters. The convolution stride may be fixed to 1 pixel, and the spatial padding of the convolution layer input may be such that the spatial resolution is preserved after convolution, i.e. the padding is 1-pixel for 3×3 conv. layers. Spatial pooling may be carried out by five max-pooling layers, which follow some of the convolutional layers. Max-pooling may be performed over a 2×2-pixel window, with stride 2. Three Fully-Connected (FC) layers may follow a stack of convolutional layers: the first two may have 4096 channels each, the third may perform 1000-way ILSVRC classification and thus contains 1000 channels (one for each class). The final layer may be the soft-max layer. The configuration of the fully connected layers may be the same in all networks.

The image recognition model 302 may take, as input, one or more images, such as the content image data 312 or the secondary content image data 314. If the image recognition model 302 uses content image data 312 as input, the content image data 312 may be image data associated with content, such as the content 104a of FIG. 1. The content may include content in a consumer's watching history. For example, the content may include movies or television shows that a consumer has watched in the past. Image data associated with the content may include one or more video frames from the content. A frame is one of many still images which compose a complete moving picture, such as a movie or television show. For example, if the content is a movie or television show, the image data associated with the content may include one or more still images from the movie or television show. Image data associated with the content may alternatively or additionally include a poster associated with the content. A poster associated with content may include a still image used to promote and advertise the content. For example, if the content is a movie, the image data may include a movie poster associated with that movie.

If the image recognition model 302 uses secondary content image data 314 as input, the secondary content image data 314 may be image data associated with secondary content, such as the supplemental content 108 of FIG. 1 and/or the content 104b of FIG. 1. If the secondary content includes supplemental content, the secondary content may include advertisements that are capable of being output to a consumer during the presentation of other types of content, such as videos. If the secondary content includes content that may be recommended for a user to watch, the secondary content may include movies or television shows that the user has not yet watched.

Image data associated with the secondary content may include one or more video frames from the secondary content. For example, if the secondary content is supplemental content, the image data associated with the secondary content may include one or more frames and/or still images from an advertisement. If the secondary content is recommended content, the image data associated with the secondary content may include one or more frames and/or still images from the recommended content. Image data associated with the secondary content may alternatively or additionally include a poster associated with the secondary content. For example, if the secondary content is supplemental content, a poster associated with the secondary content may include a still image used to promote and advertise the supplemental content. For example, if the supplemental content is an advertisement, the image data may include a poster associated with that advertisement. If the secondary content is recommended content, a poster associated with the secondary content may include a still image used to promote and advertise the secondary content. For example, if the secondary content is a movie, the image data may include a movie poster associated with that movie.

The image recognition model 302 may be configured to output encoded image data, such as encoded content image data 316 and encoded secondary content image data 318. For example, the input content image data 312 may be encoded by the image recognition model 302 and then output as encoded content image data 316. Similarly, the input secondary content image data 314 may be encoded by the image recognition model 302 and then output as encoded secondary content image data 318. The output encoded text data, such as encoded content image data 316 or encoded secondary content image data 318, may be high dimensional vectors. The output encoded image data may be used for image classification or detection.

If the output encoded image data is a high dimensional vector, the high dimensional vector may indicate numeric values associated with the input image data, such as the input content image data 312 or the input secondary content image data 314. The numeric values can be, for example, hash values. These numeric values associated with the input image data may be used to determine secondary content that contains similar images to content. For example, the secondary content selection system 114 of FIG. 1 may utilize these numeric values to determine a similarity between image data associated with content and image data associated with secondary content. The secondary content selection system 114 may, for example, determine a cosine similarity distance, such as a weighted cosine similarity distance, between the encoded image data associated with the content and the encoded image data associated with secondary content using these numeric values. By determining secondary content that contains similar images to content in a consumer's watching history, a content provider may be able to provide secondary content to the consumer that is representative of that consumer's interests. As a result, the consumer may be interested in viewing the provided secondary content.

Figure 4:
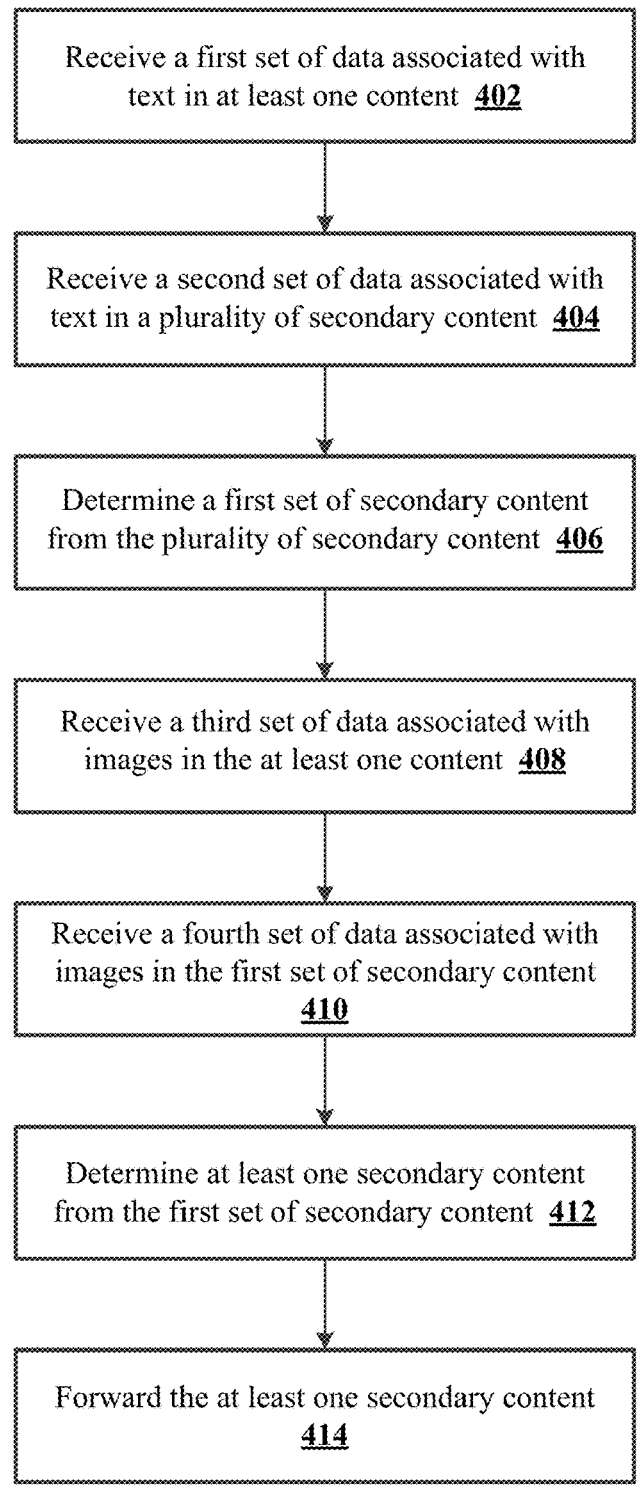
FIG. 4 illustrates a flow chart of an example method for determining supplemental content according to an embodiment of the present disclosure.

FIG. 4 illustrates an exemplary method 400 for determining secondary content for output to a consumer. The method 400 may be performed, for example, by the secondary content selection system 114 of FIG. 1. The method 400 may be used to determine secondary content that is similar to content. The method 400 may be used to determine secondary content that contains similar text, similar images, or both similar text and similar images to content. If the method 400 is used to determine secondary content that contains both similar text and images to content, the secondary content selection system 114 may determine secondary content that contains similar text to the content before it determines secondary content that contains similar image to the content, or vice versa. Alternatively, the secondary content selection system 114 may simultaneously determine secondary content that contains similar text to the content and secondary content that contains similar images to the content.

For example, the method 400 may be used to determine secondary content, such as supplemental content or recommended content, that contains similar text, similar images, or both similar text and similar images to content in a consumer's watching history. The content may be videos in a consumer's watching history. A consumer that consumes content containing certain images and text may enjoy consuming secondary content containing similar images or text. By determining secondary content that that contains similar text, similar images, or similar images and text to content that has already been consumed by a consumer, a content provider may be able to provide secondary content to the consumer that is representative of that consumer's interests. If the determined secondary content includes one or more advertisements, the consumer may be more likely to purchase the goods or services featured in the advertisement. If the determined secondary content includes one or more content recommendations, the consumer may be more likely to be interested in watching the content featured in the recommendation. The determined secondary content may be forwarded, to a device associated with the consumer.

To determine secondary content containing text similar to text featured in a consumer's watching history, the secondary content selection system 114 may utilize data indicating text in the content in the consumer's watching history. If the consumer has consumed more than one item of content, either fully or partially, the secondary content selection system 114 may utilize data indicating text in each item of content included in the consumer's watching history. At step 402, a first set of data may be received. The first set of data may be associated with content text data, such as the content text data 212 of FIG. 2. The content text data may indicate text in content, such as content included in the consumer's watching history. The content text data may indicate data associated with the content's program synopsis. For example, a program synopsis for content may include a brief summary of the content's concept, major plot points, and main characters.

The first set of data may be the output of a text encoder, such as the text encoder 110 of FIG. 1 or the text encoder 202 of FIG. 2. If the first set of data is received from a text encoder, the first set of data may be encoded text data associated with the content, such as encoded content text data 216. As described above, the encoded content text data 216 may be the output from a text encoder and may be a high dimensional vector, such as a 512-dimensional vector, indicating numeric values associated with text in the content in a consumer's watching history.

The secondary content selection system 114 may use the first set of data as well as data indicating text in secondary content in order to determine secondary content containing text similar to text featured in a consumer's watching history. At step 404, a second set of data may be received. The second set of data may be associated with secondary content text data, such as secondary content text data 214 of FIG. 2. The secondary content text data may indicate text in each of a plurality of secondary content. For example, the secondary content text data may indicate data associated with each secondary content's description. For example, if the secondary content includes supplemental content, the secondary content's description may include a brief summary of a product or service being sold in an advertisement or of the party selling the product or service. If the secondary content includes recommended content, the secondary content's description may indicate data associated with the secondary content's program synopsis. For example, a program synopsis for secondary content may include a brief summary of the secondary content's concept, major plot points, and main characters.

The second set of data may be the output of a text encoder, such as the text encoder 110 of FIG. 1 or the text encoder 202 of FIG. 2. The first set of data and the second set of data may be output from the same text encoder, or from a different text encoder. If the second set of data is output from a text encoder, the second set of data may be encoded text data associated with the secondary content, such as encoded secondary content text data 218. As described above, the encoded secondary content text data 218 may be the output from a text encoder and may be a high dimensional vector, such as a 512-dimensional vector, indicating numeric values associated with text in the secondary content. The second set of data may include encoded secondary content text data for each item of secondary content in the plurality of secondary content.

Secondary content that is similar to the consumer's watching history may be determined. The first set of data and the second set of data may be compared to determine how similar the first set of data is to the second set of data. For example, the first set of data may be compared to the encoded secondary content text data for each item of secondary content in the plurality of secondary content. The more similar the first set of data is to the encoded secondary content text data associated with a particular item of secondary content, the more similar that item of secondary content may be to the content in the consumer's watching history. At step 406, at least one secondary content from the plurality of secondary content may be determined. For example, a first set of secondary content from the plurality of secondary content may be determined. The first set of secondary content may include a predetermined quantity of items of secondary content. For example, the first set of secondary content may contain M items of supplemental content, where M is a number greater than or equal to two. The at least one secondary content may include the supplemental content from the plurality of supplemental content having the greatest similarity to the content in the consumer's watching history. For example, the secondary content in the first set may have a similarity to the content in the consumer's watching history that exceeds a threshold.

To determine the similarity between the first set of data and the second set of data, a cosine similarity distance between the first set of data and the second set of data may be determined. The cosine similarity distance between two vectors of an inner product space measures the similarity between the two vectors. If the first set of data and the second set of data are high dimensional vectors, as discussed above, the cosine similarity distance between the first set of data and the second set of data may indicate the similarity between the first set of data and the second set of data. The at least one secondary content may be the secondary content associated with the encoded secondary content text data having the greatest similarity to the first set of data.

To determine secondary content containing images similar to images featured in a consumer's watching history, the secondary content selection system 114 may utilize data indicating images in the content in the consumer's watching history. If the consumer has consumed more than one item of content, either fully or partially, the secondary content selection system 114 may utilize data indicating images in each item of content included in the consumer's watching history. At step 408, a third set of data may be received. The third set of data may be associated with content image data, such as the content image data 312 of FIG. 3. The content image data may indicate images in content, such as content included in the consumer's watching history. The content image data may indicate one or more video frames from the content. For example, if the content is a movie or television show, the content image data may include one or more still images from the movie or television show. The content image data may alternatively or additionally include a poster associated with the content. A poster associated with content may include a still image used to promote and advertise the content. For example, if the content is a movie, the image data may include a movie poster associated with that movie.

The third set of data may be the output of an image recognition model, such as the image recognition model 112 of FIG. 1 or the image recognition model 302 of FIG. 3. If the third set of data is received from an image recognition model, the third set of data may be encoded image data associated with the content, such as encoded content image data 316. As described above, the encoded content image data 316 may be the output from an image recognition model and may be a high dimensional vector, such as a 512-dimensional vector, indicating numeric values associated with images in the content in the consumer's watching history.

The secondary content selection system 114 may use the third set of data as well as data indicating images in secondary content in order to determine secondary content containing images similar to images featured in a consumer's watching history. At step 410, a fourth set of data may be received. The fourth set of data may be associated with secondary content image data, such as the secondary content image data 314 of FIG. 3. The secondary content image data may indicate one or more video frames from the secondary content. For example, if the secondary content is supplemental content, the image data associated with the secondary content may include one or more still images from an advertisement. If the secondary content is recommended content, the image data associated with the secondary content may indicate one or more video frames still images from the movie or television show. Image data associated with the secondary content may alternatively or additionally include a poster associated with the secondary content. A poster associated with secondary content may include a still image used to promote and advertise the secondary content. For example, if the secondary content is supplemental content, the secondary image data may include a poster associated with an advertisement. If the secondary content is recommended content, the secondary image data may include a still image used to promote and advertise the secondary content. For example, if the secondary content is a movie, the secondary image data may include a movie poster associated with that movie.

The fourth set of data may be the output of an image recognition model, such as the image recognition model 112 of FIG. 1 or the image recognition model 302 of FIG. 3. If the fourth set of data is received from an image recognition model, the fourth set of data may be encoded image data associated with the secondary content, such as encoded secondary content image data 318. As described above, the encoded secondary content image data 318 may be the output from an image recognition model and may be a high dimensional vector, such as a 512-dimensional vector, indicating numeric values associated with images in the secondary content.

Secondary content that is similar to the consumer's watching history may be determined. The third set of data and the fourth set of data may be compared to determine how similar the third set of data is to the fourth set of data. For example, the third set of data may be compared to the encoded secondary content image data for each item of secondary content in the plurality of secondary content. The more similar the third set of data is to the encoded secondary content image data associated with a particular item of secondary content, the more similar that item of secondary content may be to the content in the consumer's watching history. At step 412, at least one supplemental content from the plurality of secondary content may be determined. For example, a second set of secondary content from the plurality of supplemental content may be determined. The second set of secondary content may include a predetermined quantity of items of secondary content. For example, the second set of secondary content may contain N items of secondary content, where N is a number less than or equal to M. The at least one secondary content may include the secondary content from the plurality of secondary content having the greatest similarity to the content in the consumer's watching history. For example, the secondary content in the second set may have a similarity to the content in the consumer's watching history that exceeds a threshold.

To determine the similarity between the third set of data and the fourth set of data, a cosine similarity distance between the third set of data and the fourth set of data may be determined. The cosine similarity distance between two vectors of an inner product space measures the similarity between the two vectors. If the third set of data and the fourth set of data are high dimensional vectors, as discussed above, the cosine similarity distance between the third set of data and the fourth set of data may indicate the similarity between the third set of data and the fourth set of data. The at least one secondary content may be the secondary content associated with the encoded secondary content text data having the greatest similarity to the third set of data.

At step 414, the at least one secondary content may be forwarded to a device of the consumer. For example, the first set of secondary content or the second set of secondary content may be forwarded to a device of the consumer. The device may be any of a variety of different types of devices, including for example, a smartphone, a tablet computer, a laptop computer, a notebook computer, a personal computer, a television, a smart television, other consumer electronics, and the like. If the at least one secondary content includes supplemental content, the supplemental content may be inserted into other content that is output to the consumer. For example, if the consumer watches a movie or a television show, the supplemental content may be inserted into advertisements breaks of that movie or television show. If the at least one secondary content includes recommended content, the recommended content may be forwarded to the device of the consumer for selection by the user. Because the at least one secondary content is similar to the content in the consumer's watching history, the likelihood of the consumer enjoying the secondary content is increased.

Figure 5:
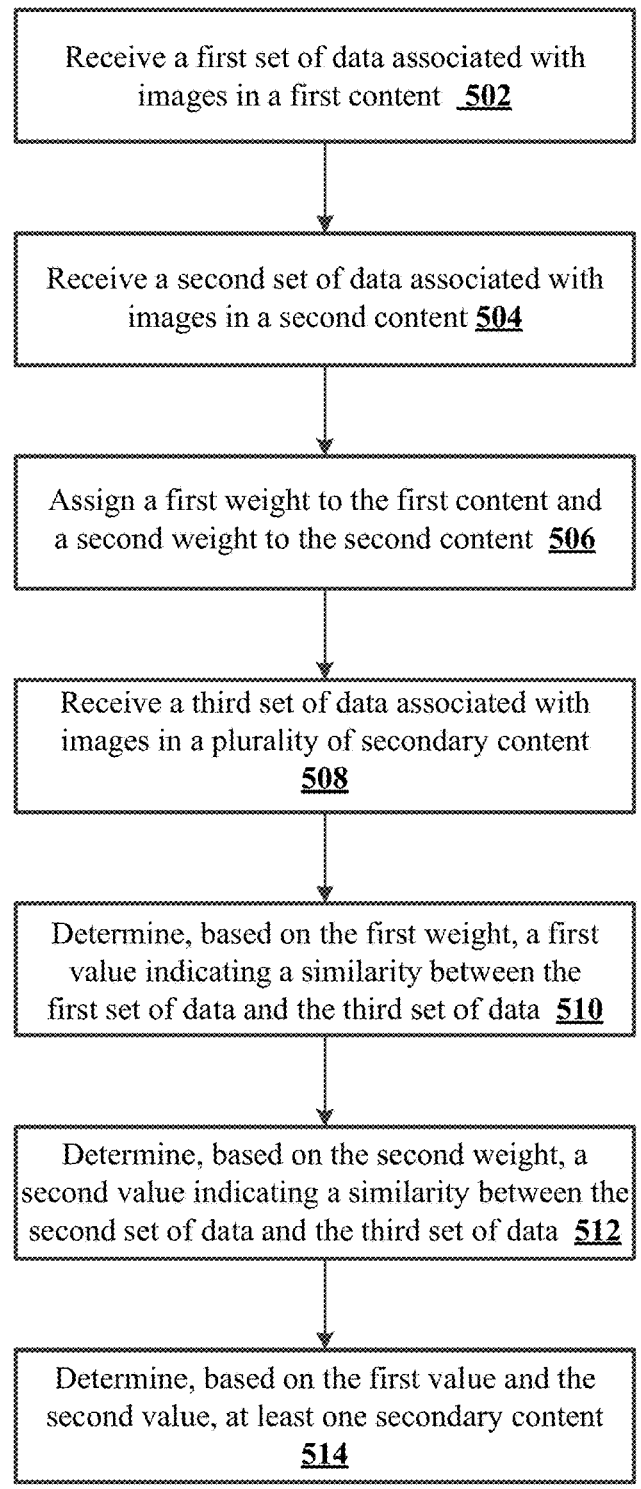
FIG. 5 illustrates a flow chart of an example method for determining supplemental content according to an embodiment of the present disclosure.

FIG. 5 illustrates an exemplary method 500 for determining secondary content for output to a consumer. The method 500 may be performed, for example, by the secondary content selection system 114 of FIG. 1. The method 500 may be used to determine secondary content that is similar to more than one item of content, such as secondary content that contains similar images to more than one item of content. For example, the method 500 may be used to determine secondary content that is similar to more than one item of content in a consumer's watching history. A consumer's watching history may include more than one item of content if the consumer has previously watched more than one item of content, such as more than one television show or movie.

One item of content in a consumer's watching history may have been output for a longer duration than another item of content. For example, a consumer may have watched one item of content for a longer duration than another item of content. If a consumer watched a particular item of content for only a short duration, such as a few minutes, then this short duration may be indicative of the fact that the consumer did not enjoy the content. Conversely, if a consumer watched a particular item of content for a longer duration, such as for the entire duration of the content, this may be indicative of the consumer enjoying the content.

When determining secondary content to output to a consumer, the method 500 may determine a weight for each item of content based on a duration that the item of content was output to the consumer. For example, method 500 may determine a weight for each item of content based on a duration that a consumer viewed the item of content. A greater weight may be determined for an item of content that was viewed for a longer duration, while a lesser weight may be determined for an item of content that was viewed for a shorter duration. Using these determined weights, the secondary content selection system 114 may determine secondary content that is similar to the more than one item of content in the consumer's watching history.

At step 502, a first set of data may be received. The first set of data may be associated with content image data, such as the content image data 312 of FIG. 3. The content image data may indicate images in a first item of content, such as a first item of content included in the consumer's watching history. The content image data may indicate one or more video frames from the first item of content. For example, if the first item of content is a movie or television show, the content image data may include one or more still images from the movie or television show. The content image data may alternatively or additionally include a poster associated with the first item of content. A poster associated with first item of content may include a still image used to promote and advertise the first item of content. For example, if the first item of content is a movie, the image data may include a movie poster associated with that movie.

The first set of data may be the output of an image recognition model, such as the image recognition model 112 of FIG. 1 or the image recognition model 302 of FIG. 3. If the first set of data is received from an image recognition model, the first set of data may be encoded image data associated with the first item of content, such as encoded content image data 316. As described above, the encoded content image data 316 may be the output from an image recognition model and may be a high dimensional vector, such as a 512-dimensional vector, indicating numeric values associated with images in the first item of content.

At step 504, a second set of data may be received. The second set of data may be associated with content image data, such as the content image data 312 of FIG. 3. The content image data may indicate images in a second item of content, such as a second item of content included in the consumer's watching history. The content image data may indicate one or more video frames from the second item of content. For example, if the second item of content is a movie or television show, the content image data may include one or more still images from the movie or television show. The content image data may alternatively or additionally include a poster associated with the second item of content. A poster associated with second item of content may include a still image used to promote and advertise the second item of content. For example, if the second item of content is a movie, the image data may include a movie poster associated with that movie.

The second set of data may be the output of an image recognition model, such as the image recognition model 112 of FIG. 1 or the image recognition model 302 of FIG. 3. If the second set of data is received from an image recognition model, the second set of data may be encoded image data associated with the second item of content, such as encoded content image data 316. As described above, the encoded content image data 316 may be the output from an image recognition model and may be a high dimensional vector, such as a 512-dimensional vector, indicating numeric values associated with images in the second item of content.

The first item of content and the second item of content may have been output to the consumer for different durations. For example, the first item of content may have been output to the consumer for a longer or shorter duration than the second item of content was output to the consumer. The first item of content and the second item of content may have been output to the consumer for different durations if the consumer viewed the first item of content and the second item of content for different durations. For example, the first item of content may have been output to the consumer for a longer duration than the second item of content if the consumer watched the first item of content for a longer duration than the consumer watched the second item of content. The duration that the consumer watched an item of content may be indicative of how much the consumer enjoyed that item of content. A longer duration may be more indicative that the consumer enjoyed the content than a shorter duration may be. Accordingly, when determining supplemental content that the consumer may enjoy, content that has been viewed for a longer duration should be given a greater weight.

At step 506, weights may be determined for the first item of content and the second item of content. A first weight may be determined for the first item of content and a second weight may be determined for the second item of content. The weights may be determined based on the duration that the content was output to the consumer. For example, the first weight may be determined based on how long the first item of content was output to the consumer and the second weight may be determined based on how long the second item of content was output to the consumer. If the first item of content was output to the consumer for a longer duration than the second item of content was output to the consumer, the first weight may be greater than the second weight.

At step 508, a third set of data may be received. The third set of data may be associated with secondary content image data, such as the secondary content image data 314 of FIG. 3. The secondary content image data may indicate one or more video frames from a plurality of secondary content. For example, if the secondary content includes supplemental content, the image data associated with the secondary content may include one or more still images from an advertisement. If the secondary content is recommended content, the image data associated with the secondary content may indicate one or more video frames still images from the movie or television show. Image data associated with secondary content may alternatively or additionally include a poster associated with the secondary content. A poster associated with secondary content may include a still image used to promote and advertise the secondary content. For example, if the secondary content is supplemental content, the secondary image data may include a poster associated with an advertisement. If the secondary content is recommended content, the secondary image data may include a still image used to promote and advertise the secondary content. For example, if the secondary content is a movie, the secondary image data may include a movie poster associated with that movie.

The third set of data may be the output of an image recognition model, such as the image recognition model 112 of FIG. 1 or the image recognition model 302 of FIG. 3. If the third set of data is received from an image recognition model, the third set of data may be encoded image data associated with the secondary content, such as encoded secondary content image data 318. As described above, the encoded secondary content image data 318 may be the output from an image recognition model and may be a high dimensional vector, such as a 512-dimensional vector, indicating numeric values associated with images in the secondary content.

The first set of data and the third set of data may be compared to determine how similar the first set of data is to the third set of data. For example, the first set of data may be compared to the encoded secondary content image data for each item of supplemental content in the plurality of secondary content. The more similar the first set of data is to the encoded secondary content image data associated with a particular item of secondary content, the more similar that item of secondary content may be to the first item of content in the consumer's watching history. At step 510, a first value indicating a similarity between the first set of data and the third set of data may be determined. The first value may be a cosine similarity distance between the first set of data and the third set of data. If the first set of data and the third set of data are high dimensional vectors, as discussed above, the cosine similarity distance between the first set of data and the third set of data may indicate the similarity between the first set of data and the third set of data. The first value may be a weighted cosine similarity distance between the first set of data and the third set of data. For example, the first value may be determined based on the first weight determined for the first item of content in the consumer's watching history.

The second set of data and the third set of data may also be compared to determine how similar the second set of data is to the third set of data. For example, the second set of data may be compared to the encoded secondary content image data for each item of secondary content in the plurality of secondary content. The more similar the second set of data is to the encoded secondary content image data associated with a particular item of secondary content, the more similar that item of secondary content may be to the second item of content in the consumer's watching history. At step 512, a second value indicating a similarity between the second set of data and the third set of data may be determined. The second value may be a cosine similarity distance between the second set of data and the third set of data. If the second set of data and the third set of data are high dimensional vectors, as discussed above, the cosine similarity distance between the second set of data and the third set of data may indicate the similarity between the second set of data and the third set of data. The second value may be a weighted cosine similarity distance between the second set of data and the third set of data. For example, the second value may be determined based on the second weight determined for the second item of content in the consumer's watching history.

Secondary content that is similar to the consumer's watching history may be determined. As the content in the consumer's watching history is weighted based on output duration, secondary content that is similar to the consumer's weighted watching history may be determined. For example, if a consumer spent a short amount of time watching a television show about sports, and none of the other content in the consumer's watching history is about sports, the determined secondary content may not be likely to include secondary content about sports. Likewise, if a consumer spent a large amount of time watching a movie about cats, the determined secondary content may be more likely to include secondary content about cats.

To ensure that the determined secondary content is indicative of a consumer's interests, the first and second values may be used when determining the secondary content. At step 514, at least one secondary content from the plurality of secondary content may be determined based on first and second value. The at least one secondary content may include the secondary content from the plurality of secondary content having the greatest similarity to the consumer's weighted watching history. For example, the at least one secondary content may include the secondary content associated with the encoded secondary content image data having the greatest similarity to the consumer's weighted watching history. The at least one secondary content may include a predetermined quantity of secondary content or may have a similarity to the consumer's weighted watching history that exceeds a threshold.

If the secondary content is supplemental content, the determined secondary content may be forwarded, to a device associated with the consumer, for insertion into other primary content output to the consumer. If the secondary content is recommended content, the determined secondary content may be forwarded, to a device associated with the consumer, for selection by the consumer.

Figure 6:
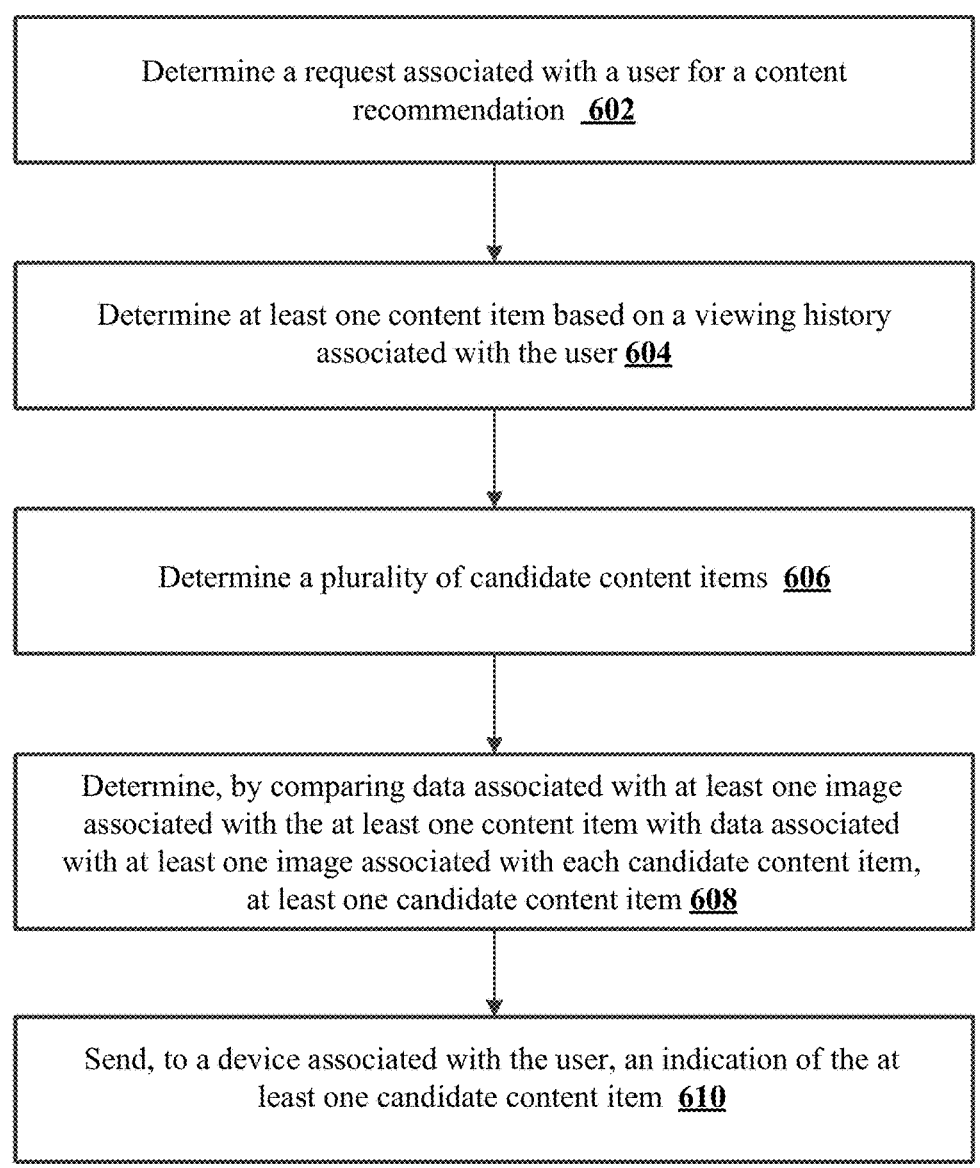
FIG. 6 illustrates a flow chart of an example method for determining supplemental content according to an embodiment of the present disclosure.

FIG. 6 illustrates an exemplary method 600 for determining secondary content for output to a consumer. The method 600 may be performed, for example, by the secondary content selection system 114 of FIG. 1. The method 600 may be used to determine secondary content that is similar to more than one item of content, such as secondary content that contains similar images to more than one item of content. For example, the method 600 may be used to determine secondary content that is similar to content in a consumer's watching history. The secondary content may include, for example, content recommendations for the consumer. The content recommendations may be determined based on the consumer's watching history. For example, if a consumer has previously viewed one or more items of content, the content recommendations for the consumer may include one or more additional content items that the consumer has not yet viewed. The content recommendations may be determined based on a similarity between images featured in the additional content items and images featured in the previously viewed content. The determined content recommendations may be forwarded, to a device associated with the consumer, for selection by the consumer.

A content recommendation may need to be determined for a user. For example, the content recommendation may include one or more movies or television shows that the user may be interested in viewing. At step 602, a request for a content recommendation may be determined. The request may be associated with a user. The user may generate the request for a content recommendation. For example, the user may be browsing for content, such as movies or television shows, that they are likely to be interested in. Additionally, or alternatively, the request for a content recommendation may be automatically generated. For example, a user may complete watching a movie or television series, and this completion may automatically trigger the generation of a request for a content recommendation.

The user may be associated with a viewing history. For example, the viewing history associated with the user may include one or more items of content, such as movies or television shows, that the consumer has previously watched. The viewing history associated with the user may indicate content that the user has previously watching for any duration. At step 604, at least one content item from a viewing history associated with the user may be determined. The at least one content item may be the only content item(s) included in the viewing history of the user, or the at least one content item may be a subset of the content item(s) included in the viewing history of the user. The at least one content item may have been previously viewed by the user for any duration. For example, the user may have previously viewed the entire duration of the at least one content item, or only a portion of the at least one content item.

The at least one content item from the viewing history of the user may be associated with data. For example, the at least one content item may be associated with at least one image, and the data associated with the at least one content item may be associated with the at least one image. The data associated with the with at least one image associated with the at least one content may be encoded image data. If the data is encoded image data, the encoded image data may be determined, for example, by the image recognition model 112. As described above, the image recognition model 112 may receive, as input, image data from content, such as the content 104a. The image recognition model 112 may encode the input image data and output the encoded image data to the secondary content selection system 114. The output encoded image data may be a high dimensional vector indicative of numeric values associated with the input image data, such as the input content image data 312. The numeric values may be, for example, hash values.

As discussed above, secondary content that contains similar images to content in a consumer's watching history may be representative of that consumer's interests. As a result, the consumer may be interested in viewing the secondary content. If the secondary content is a content recommendation, the consumer may be more likely to select the content recommendation for viewing. At step 606, a plurality of candidate secondary content items may be determined. The plurality of candidate secondary content items may be stored, for example, in the content database 102. For example, the plurality of candidate secondary content items may include the secondary content 104b. The plurality of candidate secondary content items may include content that may be recommended for the user to watch.

Each of the plurality of candidate secondary content items may be associated with data. For example, each of the plurality of candidate secondary content items may be associated with at least one image, and the data associated with each of the plurality of candidate secondary content items may be associated with the at least one image. The data associated with the with at least one image associated with each of the plurality of candidate secondary content items may be encoded image data. If the data is encoded image data, the encoded image data may be determined, for example, by the image recognition model 112. As described above, the image recognition model 112 may receive, as input, image data from secondary content, such as supplemental content 108 or the content 104b. The image recognition model 112 may encode the input image data and output the encoded image data to the secondary content selection system 114. The output encoded image data may be a high dimensional vector indicative of numeric values associated with the input image data, such as the input secondary content image data 314. The numeric values may be, for example, hash values.

One or more of the candidate secondary content items may contain similar images to the content in the user's viewing history. If a particular secondary content item contains similar images to the content in the user's viewing history, this may indicate that the user is likely to be interested in viewing the secondary content. At step 608, at least one candidate secondary content item may be determined. The at least one candidate secondary content item may include the candidate secondary content item of the plurality of secondary candidate content items that is associated with images most similar to the images associated with the at least one content in the user's viewing history.

To determine the at least one candidate secondary content item, a similarity between the data associated with the with at least one image associated with each of the plurality of candidate secondary content items and data associated with at least one image associated with the at least one content item indicative of the viewing history associated with the user may be determined. To determine the similarity between the data associated with the at least one image associated with the at least one content item and the data associated with the at least one image associated with the at least one candidate content item, a similarity between these two sets of numeric values may be determined. As described above, the similarity may be determined by determining a cosine similarity distance, such as a weighted cosine similarity distance, between the two sets of numeric values. The similarity between the two sets of numeric values may additionally, or alternatively, be determining using any other measure of similarity including a Euclidean distance, a Manhattan distance, a Minkowski distance, or a Jaccard similarity.

For example, the determined at least one candidate secondary content item may include the candidate secondary content item(s) having the greatest image-to-image similarity to the at least one content item indicative of the viewing history associated with the user. For example, the similarity between the data associated with the at least one image associated with the at least one content item and the data associated with the at least one image associated with each candidate content item may be compared to a threshold. If the similarity satisfies the threshold, this may indicate that the at least one candidate content item contains similar images to the at least one content item.

An indication of the determined candidate secondary content item(s) may be sent, to a device associated with the user. At step 610, an indication of the at least one candidate content item may be sent to the device associated with the user. If the candidate content item is a content recommendation, it may be forwarded to the user device for selection by the user. The user may select the candidate content item if the user is interested in viewing the candidate content item. As discussed above, the user may be interested in viewing the candidate content item because the candidate content item contains similar images to content that the user has previously viewed.

FIG. 7 depicts a computing device that may be used in various aspects. With regard to the example environment of FIG. 1, one or more of the secondary content selection system 114, the supplemental content database 106, the content database 102, the image recognition model 112, and the text encoder 110 may be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 4-5.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A user interface may be provided between the CPU(s) 704 and the remainder of the components and devices on the baseboard. The interface may be used to access a random access memory (RAM) 708 used as the main memory in the computing device 700. The interface may be used to access a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein. The user interface may be provided by a one or more electrical components such as the chipset 706.

The computing device 700 may operate in a networked environment using logical connections to remote computing nodes and computer systems through local area network (LAN) 616. The chipset 706 may include functionality for providing network connectivity through a network interface controller (NIC) 722, such as a gigabit Ethernet adapter. A NIC 722 may be capable of connecting the computing device 700 to other computing nodes over a network 616. It should be appreciated that multiple NICs 722 may be present in the computing device 700, connecting the computing device to other types of networks and remote computer systems.

The computing device 700 may be connected to a storage device 728 that provides non-volatile storage for the computer. The storage device 728 may store system programs, application programs, other program modules, and data, which have been described in greater detail herein. The storage device 728 may be connected to the computing device 700 through a storage controller 724 connected to the chipset 706. The storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 728 is characterized as primary or secondary storage and the like.

For example, the computing device 700 may store information to the storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the storage device 728 by detecting the physical states or characteristics of one or more particular locations within the physical storage units.

In addition or alternatively to the storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 728 may store other system or application programs and data utilized by the computing device 700.

The storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 4-5.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining a request associated with a user for a content recommendation;
   determining, based on a viewing history associated with the user, at least one content item comprising video content;
   determining, based on comparing encoded data associated with text associated with the at least one content item with encoded data associated with the text associated with each candidate content item of a plurality of candidate content items, a subset of candidate content items of the plurality of candidate content items, wherein the encoded data associated with the text associated with the at least one content item and the encoded data associated with the text associated with each candidate content item each comprise one or more vectors configured to facilitate natural language processing;
   determining, based on comparing encoded data associated with at least one image associated with the at least one content item with encoded data associated with at least one image associated with each of the subset of candidate content items, at least one candidate content item of the subset of candidate content items, wherein the encoded data associated with the at least one image associated with the at least one content item and the encoded data associated with the at least one image associated with each of the subset of candidate content items each comprise one or more vectors configured to facilitate image classification or detection; and
   sending, to a device associated with the user, an indication of the at least one candidate content item.

2. The method of claim 1, further comprising:
   determining the encoded data associated with the text associated with each of the plurality of candidate content items using a first machine learning algorithm; and
   determining the encoded data associated with the at least one image associated with each of the subset of candidate content items using a second machine learning algorithm.

3. The method of claim 1, wherein determining the subset of candidate content items comprises:
   determining a similarity between the encoded data associated with the text associated with the at least one content item and the encoded data associated with the text associated with each candidate content item of the plurality of candidate content items.

4. The method of claim 3, wherein determining the similarity between the encoded data associated with the text associated with the at least one content item and the encoded data associated with the text associated with each candidate content item of the plurality of candidate content items comprises:
   determining a cosine similarity distance between the encoded data associated with the text associated with the at least one content item and the encoded data associated with the text associated with each candidate content item of the plurality of candidate content items.

5. The method of claim 3, wherein determining the subset of candidate content items further comprises:
   comparing the similarity between the encoded data associated with the text associated with the at least one content item and the encoded data associated with the text associated with each candidate content item of the plurality of candidate content items with a threshold; and
   determining that the similarity between the encoded data associated with the text associated with the at least one content item and the encoded data associated with the text associated with the at least one candidate content item satisfies the threshold.

6. The method of claim 1, wherein determining the at least one candidate content item comprises:
   determining a similarity between the encoded data associated with the at least one image associated with the at least one content item and the encoded data associated with the at least one image associated with each candidate content item of the subset of candidate content items.

7. The method of claim 6, wherein determining the similarity between the encoded data associated with the at least one image associated with the at least one content item and the encoded data associated with the at least one image associated with each candidate content item of the subset of candidate content items comprises:
   determining a cosine similarity distance between the encoded data associated with the at least one image associated with the at least one content item and the encoded data associated with the at least one image associated with each candidate content item of the subset of candidate content items.

8. The method of claim 6, wherein determining the at least one candidate content item further comprises:
   comparing the similarity between the encoded data associated with the at least one image associated with the at least one content item and the encoded data associated with the at least one image associated with each candidate content item of the subset of candidate content items with a threshold; and
   determining that the similarity between the encoded data associated with the at least one image associated with the at least one content item and the encoded data associated with the at least one image associated with the at least one candidate content item satisfies the threshold.

9. A device comprising:
   one or more processors; and
   memory storing instructions that, when executed by the one or more processors, cause the device to:
   determine a request associated with a user for a content recommendation;
   determine, based on a viewing history associated with the user, at least one content item comprising video content;
   determine, based on comparing encoded data associated with text associated with the at least one content item with encoded data associated with text associated with each candidate content item of a plurality of candidate content items, a subset of candidate content items of the plurality of candidate content items, wherein the encoded data associated with the text associated with the at least one content item and the encoded data associated with the text associated with each candidate content item each comprise one or more vectors configured to facilitate natural language processing;
   determine, based on comparing encoded data associated with at least one image associated with the at least one content item with encoded data associated with at least one image associated with each of the subset of candidate content items, at least one candidate content item of the subset of candidate content items, wherein the encoded data associated with the at least one image associated with the at least one content item and the encoded data associated with the at least one image associated with each of the subset of candidate content items each comprise one or more vectors configured to facilitate image classification or detection; and send, to an output device associated with the user, an indication of the at least one candidate content item.

10. The device of claim 9, wherein the instructions, when executed by the one or more processors, further cause the device to:

determine the encoded data associated with the text associated with each of the plurality of candidate content items using a first machine learning algorithm; and determine the encoded data associated with the at least one image associated with each of the subset of candidate content items using a second machine learning algorithm.

11. The device of claim 9, wherein the instructions that, when executed by the one or more processors, cause the device to determine the subset of candidate content items comprise instructions that, when executed by the one or more processors, cause the device to:

determine a similarity between the encoded data associated with the text associated with the at least one content item and the encoded data associated with the text associated with each candidate content item of the plurality of candidate content items.

12. The device of claim 11, wherein the instructions that, when executed by the one or more processors, cause the device to determine the similarity between the encoded data associated with the text associated with the at least one content item and the encoded data associated with the text associated with each candidate content item of the plurality of candidate content items comprise instructions that, when executed by the one or more processors, cause the device to:

determine a cosine similarity distance between the encoded data associated with the text associated with the at least one content item and the encoded data associated with the text associated with each candidate content item of the plurality of candidate content items.

13. The device of claim 11, wherein the instructions that, when executed by the one or more processors, cause the device to determine the subset of candidate content items further comprise instructions that, when executed by the one or more processors, cause the device to:

compare the similarity between the encoded data associated with the text associated with the at least one content item and the encoded data associated with the text associated with each candidate content item of the plurality of candidate content items with a threshold; and determine that the similarity between the encoded data associated with the text associated with the at least one content item and the encoded data associated with the text associated with the at least one candidate content item satisfies the threshold.

14. The device of claim 9, wherein the instructions that, when executed by the one or more processors, cause the device to determine the at least one candidate content item comprise instructions that, when executed by the one or more processors, cause the device to:

determine a similarity between the encoded data associated with the at least one image associated with the at least one content item and the encoded data associated with the at least one image associated with each candidate content item of the subset of candidate content items.

15. The device of claim 14, wherein the instructions that, when executed by the one or more processors, cause the device to determine the similarity between the encoded data associated with the at least one image associated with the at least one content item and the encoded data associated with the at least one image associated with each candidate content item of the subset of candidate content items comprise instructions that, when executed by the one or more processors, cause the device to:

determine a cosine similarity distance between the encoded data associated with the at least one image associated with the at least one content item and the encoded data associated with the at least one image associated with each candidate content item of the subset of candidate content items.

16. The device of claim 14, wherein the instructions that, when executed by the one or more processors, cause the device to determine the at least one candidate content item further comprise instructions that, when executed by the one or more processors, cause the device to:

compare the similarity between the encoded data associated with the at least one image associated with the at least one content item and the encoded data associated with the at least one image associated with each candidate content item of the subset of candidate content items with a threshold; and determine that the similarity between the encoded data associated with the at least one image associated with the at least one content item and the encoded data associated with the at least one image associated with the at least one candidate content item satisfies the threshold.

17. A computer-readable medium storing instructions that, when executed, cause:

determining a request associated with a user for a content recommendation;

determining, based on a viewing history associated with the user, at least one content item comprising video content;

determining, based on comparing encoded data associated with text associated with the at least one content item with encoded data associated with text associated with each candidate content item of a plurality of candidate content items, a subset of candidate content items of the plurality of candidate content items, wherein the encoded data associated with the text associated with the at least one content item and the encoded data associated with the text associated with each candidate content item each comprise one or more vectors configured to facilitate natural language processing;

determining, based on comparing encoded data associated with at least one image associated with the at least one content item with encoded data associated with at least one image associated with each of the subset of candidate content items, at least one candidate content item of the subset of candidate content items, wherein the encoded data associated with the at least one image associated with the at least one content item and the encoded data associated with the at least one image associated with each of the subset of candidate content items each comprise one or more vectors configured to facilitate image classification or detection; and sending, to a device associated with the user, an indication of the at least one candidate content item.

18. The computer-readable medium of claim 17, wherein the instructions, when executed, further cause:
    determining the encoded data associated with the text associated with each of the plurality of candidate content items using a first machine learning algorithm; and
    determining the encoded data associated with the at least one image associated with each of the subset of candidate content items using a second machine learning algorithm.

19. The computer-readable medium of claim 17, wherein the instructions that, when executed, cause determining the subset of candidate content items comprise instructions that, when executed, cause:
    determining a similarity between the encoded data associated with the text associated with the at least one content item and the encoded data associated with the text associated with each candidate content item of the plurality of candidate content items.

20. The computer-readable medium of claim 19, wherein the instructions that, when executed, cause determining the similarity between the encoded data associated with the text associated with the at least one content item and the encoded data associated with the text associated with each candidate content item of the plurality of candidate content items comprise instructions that, when executed, cause:
    determining a cosine similarity distance between the encoded data associated with the text associated with the at least one content item and the encoded data associated with the text associated with each candidate content item of the plurality of candidate content items.

21. The computer-readable medium of claim 19, wherein determining the subset of candidate content items further comprises:
    comparing the similarity between the encoded data associated with the text associated with the at least one content item and the encoded data associated with the text associated with each candidate content item of the plurality of candidate content items with a threshold; and
    determining that the similarity between the encoded data associated with the text associated with the at least one content item and the encoded data associated with the text associated with the at least one candidate content item satisfies the threshold.

22. The computer-readable medium of claim 17, wherein the instructions that, when executed, cause determining the at least one candidate content item comprise instructions that, when executed, cause:
    determining a similarity between the encoded data associated with the at least one image associated with the at least one content item and the encoded data associated with the at least one image associated with each candidate content item of the subset of candidate content items.

23. The computer-readable medium of claim 22, wherein the instructions that, when executed, cause determining the similarity between the encoded data associated with the at least one image associated with the at least one content item and the encoded data associated with the at least one image associated with each candidate content item of the subset of candidate content items comprise instructions that, when executed, cause:
    determining a cosine similarity distance between the encoded data associated with the at least one image associated with the at least one content item and the encoded data associated with the at least one image associated with each candidate content item of the subset of candidate content items.

24. The computer-readable medium of claim 22, wherein the instructions that, when executed, cause determining the at least one candidate content item further comprise instructions that, when executed, cause:
    comparing the similarity between the encoded data associated with the at least one image associated with the at least one content item and the encoded data associated with the at least one image associated with each candidate content item of the subset of candidate content items with a threshold; and
    determining that the similarity between the encoded data associated with the at least one image associated with the at least one content item and the encoded data associated with the at least one image associated with the at least one candidate content item satisfies the threshold.

25. A system comprising:
    a device associated with a user; and
    a computing device configured to:
        determine a request associated with the user for a content recommendation;
        determine, based on a viewing history associated with the user, at least one content item comprising video content;
        determine, based on comparing encoded data associated with text associated with the at least one content item with encoded data associated with text associated with each candidate content item of a plurality of candidate content items, a subset of candidate content items of the plurality of candidate content items, wherein the encoded data associated with the text associated with the at least one content item and the encoded data associated with the text associated with each candidate content item each comprise one or more vectors configured to facilitate natural language processing;
        determine, based on comparing encoded data associated with at least one image associated with the at least one content item with encoded data associated with at least one image associated with each of the subset of candidate content items, at least one candidate content item of the subset of candidate content items, wherein the encoded data associated with the at least one image associated with the at least one content item and the encoded data associated with the at least one image associated with each of the subset of candidate content items each comprise one or more vectors configured to facilitate image classification or detection; and
        send, to the device associated with the user, an indication of the at least one candidate content item.

26. The system of claim 25, wherein the computing device is further configured to:
    determine the encoded data associated with the text associated with each of the plurality of candidate content items using a first machine learning algorithm; and
    determine the encoded data associated with the at least one image associated with each of the subset of candidate content items using a second machine learning algorithm.

27. The system of claim 25, wherein the computing device is configured to determine the subset of candidate content items based on:

determining a similarity between the encoded data associated with the text associated with the at least one content item and the encoded data associated with the text associated with each candidate content item of the plurality of candidate content items.

28. The system of claim 27, wherein the computing device is configured to determine the similarity between the encoded data associated with the text associated with the at least one content item and the encoded data associated with the text associated with each candidate content item of the plurality of candidate content items based on:
   determining a cosine similarity distance between the encoded data associated with the text associated with the at least one content item and the encoded data associated with the text associated with each candidate content item of the plurality of candidate content items.

29. The system of claim 27, wherein the computing device is configured to determine the subset of candidate content items based on:
   comparing the similarity between the encoded data associated with the text associated with the at least one content item and the encoded data associated with the text associated with each candidate content item of the plurality of candidate content items with a threshold; and
   determining that the similarity between the encoded data associated with the text associated with the at least one content item and the encoded data associated with the text associated with the at least one candidate content item satisfies the threshold.

30. The system of claim 25, wherein the computing device is configured to determine the at least one candidate content item based on:
   determining a similarity between the encoded data associated with the at least one image associated with the at least one content item and the encoded data associated with the at least one image associated with each candidate content item of the subset of candidate content items.

31. The system of claim 30, wherein the computing device is configured to determine the similarity between the encoded data associated with the at least one image associated with the at least one content item and the encoded data associated with the at least one image associated with each candidate content item of the subset of candidate content items based on:
   determining a cosine similarity distance between the encoded data associated with the at least one image associated with the at least one content item and the encoded data associated with the at least one image associated with each candidate content item of the subset of candidate content items.

32. The system of claim 30, wherein the computing device is configured to determine the at least one candidate content item further based on:
   comparing the similarity between the encoded data associated with the at least one image associated with the at least one content item and the encoded data associated with the at least one image associated with each candidate content item of the subset of candidate content items with a threshold; and
   determining that the similarity between the encoded data associated with the at least one image associated with the at least one content item and the encoded data associated with the at least one image associated with the at least one candidate content item satisfies the threshold.

\* \* \* \* \*